(12) United States Patent
Shieh

(10) Patent No.: US 8,781,230 B2
(45) Date of Patent: Jul. 15, 2014

(54) VIDEO-BASED BIOMETRIC SIGNATURE DATA COLLECTION

(75) Inventor: Kelvin Shieh, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 1142 days.

(21) Appl. No.: 11/938,817

(22) Filed: Nov. 13, 2007

(65) Prior Publication Data

US 2010/0283766 A1 Nov. 11, 2010

(30) Foreign Application Priority Data

Dec. 29, 2006 (TW) .............................. 95150066 A

(51) Int. Cl.
*G06F 9/00* (2006.01)
*G06F 3/033* (2013.01)

(52) U.S. Cl.
USPC ........................... 382/187; 382/119; 345/179

(58) Field of Classification Search
None
See application file for complete search history.

(56) References Cited

U.S. PATENT DOCUMENTS

| | | | |
|---|---|---|---|
| 4,189,743 A | 2/1980 | Schure et al. | |
| 6,011,873 A * | 1/2000 | Desai et al. | 382/245 |
| 6,044,165 A | 3/2000 | Perona et al. | |
| 6,064,751 A | 5/2000 | Smithies et al. | |
| 6,100,538 A | 8/2000 | Ogawa | |
| 6,377,249 B1 | 4/2002 | Mumford | |
| 6,543,935 B2 | 4/2003 | Balla et al. | |
| 6,714,311 B2 | 3/2004 | Hashimoto | |
| 6,718,060 B1 * | 4/2004 | Yokota et al. | 382/187 |
| 7,257,255 B2 | 8/2007 | Pittel | |
| 7,279,646 B2 | 10/2007 | Xu | |
| 7,961,917 B2 | 6/2011 | Black | |
| 2002/0015159 A1 * | 2/2002 | Hashimoto | 356/620 |
| 2002/0176225 A1 | 11/2002 | O'Hara et al. | |

(Continued)

FOREIGN PATENT DOCUMENTS

| | | | |
|---|---|---|---|
| WO | 9514286 A1 | | 5/1995 |
| WO | WO9916013 | * | 4/1999 |
| WO | 0227461 A1 | | 4/2002 |
| WO | WO0232151 A2 | | 4/2002 |

OTHER PUBLICATIONS

A. Pacut et al, Recognition of human signatures, International Joint Conference on Neural Networks, Proceedings (Cat. No. 01CH37222), 2001, pt. 2, p. 1560-4, vol. 2.

(Continued)

*Primary Examiner* — Kim Vu
*Assistant Examiner* — Fred Hu
(74) *Attorney, Agent, or Firm* — Yee & Associates, P.C.; Parashos Kalaitzis

(57) ABSTRACT

Video-based handwriting input for biometric signature data collection is provided. The invention is implemented by finding all of the relative positions among all light points of light sources when all light sources mounted on a stylus are turned ON. An image is captured including effective strokes and digital data of pen pressure with a digital camera when a user writes on a writing surface with a stylus having a light source indicating x-y coordinates of strokes. The images are time-stamped. The stylus includes a micro-switch. When the stylus touches the writing surface, the micro-switch is turned on to let the light source indicating x-y coordinates of strokes turn ON and generate a light point. Effective stroke images and digital data of pen pressure are extracted by comparing the captured images with the light point on the stylus.

18 Claims, 7 Drawing Sheets

(56) References Cited

U.S. PATENT DOCUMENTS

| | | |
|---|---|---|
| 2002/0176577 A1 | 11/2002 | Xu |
| 2003/0021331 A1 | 1/2003 | Balla et al. |
| 2003/0095708 A1* | 5/2003 | Pittel .............................. 382/187 |
| 2003/0210946 A1 | 11/2003 | De Schrijver et al. |
| 2005/0180618 A1 | 8/2005 | Black et al. |
| 2007/0200121 A1 | 8/2007 | Lankhorst et al. |
| 2012/0206420 A1 | 8/2012 | Shieh |

OTHER PUBLICATIONS

S. E. George, Biometric verification in dynamic writing, Proceedings of the SPIE—The International Society for Optical Engineering, v 4738, 2002, p. 125-32.

P. Zhao et al, On-line signature verification by adaptively weighted DP matching, IEICE Transactions on Information and Systems, v E79-D, n. 5, May 1996.

Notice of Allowance dated Aug. 30, 2013, regarding USPTO U.S. Appl. No. 13/412,952, 10 pages.

International Search Report dated May 29, 2008, regarding Application No. PCT/EP2007/06871, 15 pages.

Final Office Action, dated Mar. 18, 2013, regarding USPTO U.S. Appl. No. 13/412,952, 14 pages.

Shieh, "Video-Based Biometric Signature Data Collecting Method and Apparatus," U.S. Appl. No. 13/412,952, filed Mar. 6, 2012, 27 pages.

Office Action dated Dec. 13, 2012 regarding USPTO U.S. Appl. No. 13/412,952, 17 pages.

* cited by examiner

VIDEO-BASED BIOMETRIC SIGNATURE DATA COLLECTION

CROSS REFERENCE TO RELATED APPLICATIONS

This application claims priority to Taiwan Patent Application No. 95150066 entitled "VIDEO-BASED BIOMETRIC SIGNATURE DATA COLLECTING METHOD AND APPARATUS", filed on Dec. 29, 2006, which is incorporated herein by reference and assigned to the assignee herein.

FIELD OF INVENTION

The present invention generally relates to a handwriting input method and apparatus, and more particularly, to a handwriting input method and apparatus by capturing image data of real-time handwriting strokes and biometric data (e.g. pen pressure) with a digital camera for recognition or authentication.

BACKGROUND OF THE INVENTION

With the fast development of computer technologies, there appear to be many information processing devices for accepting users' handwriting input with a handwriting recognition subsystem, such as personal digital assistants PDA or hand portable computers HPC. A handwriting recognition subsystem tends to be useful in the environment of inputting text into a small mobile device like a PDA, or inputting hard-to-enter characters like Chinese into a computer. Users can input handwritten data and symbols into computers by means of pen-like devices. Corresponding to this, there appear to be many handwriting character recognition devices, which can recognize a user's handwriting input.

In the field of handwriting input, two approaches to handwriting character recognition are: on-line character recognition (OLCR) and optical character recognition (OCR). The OCR approach is sometimes also referred to as off-line handwriting recognition. In general, the on-line character recognition (OLCR) technique employs dynamic handwriting information, while the off-line handwriting recognition employs static handwriting information. All OCR systems generally use an input device, such as an optical scanner, for reading text from existing documents into a computer, such as to an image file, and process the image file by data perceiving and data re-construction (e.g. analyze the patterns and identify the characters they represent) to produce a text file for editing or other use later. Relative to the OLCR technique, as the OCR technique cannot obtain real-time dynamic handwriting information such as stroke direction, stroke order, pen tip pressure or speed, etc., as features, the recognition rate will be affected.

The OLCR technique uses a stylus as a handwriting input device to write characters one by one on a digitizing tablet, and then recognizes these characters by a recognition software. In addition to strokes, OLCR technique employs dynamic handwriting information, such as stroke direction, stroke order, tip pressure or speed, etc., as features, it provides generally better recognition accuracy, and is used widely for current handwriting input devices. See the publications entitled, "On-line signature verification by adaptively weighted DP matching," Authors: Zhao, P. (CADIX Inc., Tokyo, Japan); Higashi, A.; Sato, Y. Source: IEICE Transactions on Information and Systems, Vol. E79-D, No. 5, May 1996, p 535-541; "Recognition of human signatures," Authors: Pacut, A. (Warsaw Univ. of Technol., Poland); Czajka, A. Source: IJCNN'01. International Joint Conference on Neural Networks, Proceedings (Cat. No. 01CH37222), 2001, pt. 2, p. 1560-4 vol. 2; and "Biometric verification in dynamic writing," Authors: George, S. E. (Sch. of Comput. & Inf. Sci., Univ. of South Australia, Adelaide, SA, Australia) Source: Proceedings of the SPIE—The International Society for Optical Engineering, v 4738, 2002, p 125-32.

One of the applications of handwriting recognition today is signature recognition for biometric identification and/or verification, most typically used for retail or safeguarding applications, etc. In these applications, the underlying method is to consider the writing pressure (i.e. pen pressure) of a stylus or a pen on a writing surface, in addition to the sequence of x,y-coordinates, as biometric information of a person is considered as a basis for authentication. The authentication technique based on signature verification always utilizes a pressure-sensitive pen and a tablet to record a user's signature. Signature verification then compares the user's signature against a stored signature sample corresponding to the same user, and determines true or false to identify the user.

At present, conventional handwriting input devices utilizing OLCR technique usually request a touch-sensitive pad (e.g. digitizing tablet) which incorporates either magnetic sensor or pressure sensor to sense and record the pen strokes that are touching the pad surface. The conventional digitizing tablet usually has a wire connecting an external smart stylus.

The IBM's ThinkScribe™ is a device integrating a handwriting digitizer having a digitizing tablet with a traditional paper-based recording system. The digitizing tablet includes an active area capable of receiving electromagnetic signals from a radio frequency coupled stylus. This device records a user's handwriting input in strokes and associated timing and can reproduce the user's handwriting input according to the original timing information. A user may write the documents to be transmitted on the digitizing tablet or paper. The digitizing tablet generates a data flow representative of strokes and the associated events, and records the data flow in a nonvolatile memory. The associated events in the data flow may be generally categorized as being either automatically generated by the input device or as being user-invoked. Automatically generated events are events which occur and are detected and recorded without specific input from the user. For example, there may be defined a pen-down event which indicates that the stylus was brought into contact with the writing surface and a pen-up event which indicates that the stylus was lifted from the writing surface. An "ink trace" may thus be defined as a series of pen coordinates recorded between a pen-down and a pen-up event.

All of the input devices mentioned above require a touch-sensitive pad which incorporates either a magnetic sensor or pressure sensor to sense and record the pen strokes that are touching the pad's surface. The pad may be provided at an additional cost to an existing PDA or a personal computer. The pad is also large in size which either is difficult to carry, or it occupies the screen area when it is built onto a PDA and in operation. The pad usually has a wire connecting the pad to the computer, and a wire connecting the pen to the pad. The situation sometimes is a hassle. Besides, considering the identification or verification of the user of a low-cost and low computational power device, such as a mobile phone or a PDA, our choices would then be limited, since it would be unreasonable to attach a high-cost device to collect biometric data for identification or verification, or to adopt a method which needs a lot of computation power to identify or verify the identity of the user. Thus, there is a need to provide a low-cost method and device for signature recognition or authentication which is capable of providing more accurate biometric data (signature data) to a mobile phone or a PDA which only needs reasonable computation power.

In other types of handwriting recognition systems, a pure digital camera input may be used for the sake of handwriting recognition, however, the processing is complicated and the results may not be good. For instance, disclosed in U.S. Pat. No. 6,044,165, assigned to California Institute of Technology, is a technique that uses a digital camera which monitors movement of a writing implement relative to a writing surface, and associated processing hardware which processes the output of the camera to track that movement. However, there are no disclosures to collect biometric data for identification or verification utilizing a digital camera.

As many computer systems (e.g. notebook PC, pervasive device, PDA etc.) are increasingly entering the market equipped with an embedded digital camera of relatively high resolution, it would be advantageous to provide digital video data with the digital camera for use in the handwriting recognition process in such pervasive devices. Accordingly, there is a need to provide an easier low-cost solution to collect biometric data (e.g. signature data) for recognition or authentication which enables a user to write on a paper without a touch-sensitive pad and a wire connecting the sensor to a computer (or a pervasive device and the like) and a wire connecting a stylus (or a pen) to the pad, but equipped with a low-cost digital camera functioning to overcome the known drawbacks mentioned above.

SUMMARY OF THE INVENTION

It is thus an object of the present invention to provide a simple, low-cost, wireless method and apparatus of collecting biometric data (e.g. signature data) for recognition or authentication which enables a user to write on a paper without a touch sensitive pad provided for a computer system (such as Notebook and PDA etc.) equipped with an embedded digital camera. The purpose of the present invention is not the identification/verification algorithm itself, but the data acquisition method.

This invention discloses the retrieval of an accumulated locus (e.g. effective strokes) of the light point of a stylus, not an ink locus itself, and pen pressure data. Thus, it is another object of the present invention to provide a method and apparatus for handwriting input with better recognition accuracy which can be used for a real paper environment or for a non-paper environment on which there is not any ink locus.

The present invention discloses a method and an apparatus, as well as a computer recording medium for collecting biometric data (signature data) for recognition or authentication. The invention is implemented by finding all relative positions among all light points of light sources when all light sources mounted on a stylus are turned ON; capturing an image including effective strokes and digital data of pen pressure with a digital camera, when a user writes on a writing surface with a stylus having a light source (e.g. LED) indicating x-y coordinates of strokes, said images being time-stamped; wherein the stylus comprises a micro-switch, and when the stylus touches the writing surface, the micro-switch is turned on to let the light source indicate x-y coordinates of strokes turn ON and generate a "light point"; and extracting effective stroke images and digital data of pen pressure by comparing the captured images with the light point of the light source indicating x-y coordinates of strokes on the stylus. Moreover, the invention discloses a low-cost, wireless method and apparatus for handwriting input which enables a user to write on a paper without a touch-sensitive pad provided for a computer system (such as Notebook and PDA etc.) equipped with an embedded digital camera.

DETAILED DESCRIPTION OF THE INVENTION

Terminology:

The following terms will be used throughout the detailed description:

Strokes—the track of movement of a pen or stylus. The strokes comprise text, marks, lines, and/or shapes written on or in proximity to a writing surface or a surface of a paper, including the solid lines and broken lines shown in FIG. 7.

Ink traces—the ink traces comprise text written on a surface of a paper, as the solid lines shown in FIG. 7, indicative of the effective strokes, i.e. character itself.

Biometric—measurable biological characteristics. Biometrics is the study of automated methods for uniquely recognizing humans based on physiological or behavioral characteristics of an individual. There are several biometrics methods to identify or verify a person. Some examples of physiological characteristics include, but are not limited to, fingerprint, facial features, iris pattern, retinal pattern or hand geometry, etc., while examples of behavioral characteristics include signature pattern, voice characteristics, typing pattern or keystroke dynamics, etc.

The following will describe the embodiment of the present invention. The disclosed embodiment is only for illustration, thus it will be understood by those skilled in the art that there are many modifications and changes made therein without departing from the spirit and scope of the invention. Throughout the appended drawings, like features are identified by like reference numerals.

FIG. 1 & FIG. 2 respectively illustrate different information processing systems implementing the present invention. In FIG. 1, a PDA 100 or a similar pervasive computing device includes an embedded digital camera 110 and a strokes/pen pressure retrieving module (not shown). The digital camera 110 can be a charge coupled device (CCD) or complementary metal oxide semiconductor (CMOS) digital camera or an infrared camera.

When a user writes with a stylus or pen 130 on a writing surface or a paper 140, the digital camera 110 will capture images including real-time strokes. The strokes/pen pressure retrieving module includes the function of producing time-stamped dynamic video data output corresponding to the images of the real-time strokes of the movement of the stylus 130. Similarly, when the user writes on the writing surface, the module includes the function of producing time-stamped digital data representing pen pressure corresponding to the images of the real-time strokes from the images captured by the digital camera 110. There is a light source 181 (e.g. LED) mounted beside the tip 150 of the stylus 130 for the module to extract the images of the real-time effective strokes from the images captured by the digital camera 110. A PDA or a similar pervasive device can receive the images captured by the digital camera 110, and then extract the images of the real-time effective strokes for recognition according to the strokes/pen pressure retrieving module of the present invention shown in FIG. 5.

Similarly, the computer system 200 of FIG. 2 includes a host 210, screen 220 and a strokes/pen pressure retrieving module (not shown). There is a digital camera 110 embedded on screen 220 to capture images of real-time strokes for producing time-stamped dynamic video data and time-stamped digital data representing pen pressure corresponding to the images of the real-time strokes.

FIG. 3 shows stylus 130 used for the invention. The stylus 130 includes a micro-switch 160, a pressure sensor 162, an analog to digital converter (A/D converter) 164, a micro-controller 166, a memory 168, a battery 170, and 4 light sources, each of which is located at a different position (e.g. LEDs 181, 182, 183 & 184).

The pressure sensor 162 associated with the tip 150 of stylus 130 may preferably be a low-cost piezoelectric device which converts the pen pressure of the stylus tip to voltage signals representing pen pressure. A/D converter 164 converts the voltage signals representing pen pressure to digital data of pen pressure for micro-controller 166.

FIG. 4 depicts the flowchart of a monitor module in micro-controller 166 embedded in stylus 130 according to the present invention. Step 401 determines if stylus 130 touches the writing surface. When stylus 130 is brought into contact with the writing surface, micro-switch 160 is turned ON, light source (LED) 181 indicating x, y coordinates of strokes, which is located at the first location on stylus 130, is energized by battery 170 and is also turned ON to generate a "light point". At the same time, as micro-switch 160 is ON, an ON signal 161 is generated to inform micro-controller 166 for sending out a sampling signal 167 to A/D converter 164 and starting periodically to sample the output voltage signal of piezoelectric sensor 162 corresponding to the pen pressure and to receive the digital data of pen pressure converted by A/D converter 164, such as 8-bit digital data (Step 403). The frequency of sampling signal 167 is the same as the frequency of taking images with digital camera 110 embedded in PDA 100 or computer system 200, respectively shown in FIG. 1 or FIG. 2. The preferred frequency of the sampling signal is about 30 Hz. At step 405, micro-controller 166 will compress/encode the digital data of pen pressure via a conduit such as the conventional differential pulse code modulation (DPCM) to be preferably 3 bits and store the digital data in memory 168, e.g. first-in-first-out (FIFO). There are other compressing/encoding techniques available, e.g. ADPCM (Adapter Differential PCM) or ADM (Adaptive Delta Modulation) etc. Finally, at step 407, through the ON/OFF switching of the second, third, and fourth light sources (LED 182, 183, 184) for transmission of pen pressure data, respectively located at different locations on stylus 130, the compressed/encoded digital data of pen pressure is further transmitted in the form of light signals to PDA 100 or computer system 200 for reading.

Step 409 determines whether stylus 130 is lifted off of the writing surface. If not determined to have occurred yet, repeat steps 403, 405, and 407. When the stylus lifts off of the writing surface, micro-switch 160 is turned OFF. The battery 170 does not energize the light source (LED) 181, light source 181 is turned OFF and extinguished, and then the light point disappears. Simultaneously, micro-controller 166 will also stop sampling the output voltage signal of piezoelectric sensor 162.

The light sources (LEDs 181, 182, 183, 184) having different locations as mentioned above may be replaced with LEDs having different colors (e.g. White, Red, Green or Blue color). The compressed/encoded digital data of pen pressure is transmitted to PDA 100 or computer system 200 through the ON/OFF switching of the light sources 182, 183, 184 having different colors. The light sources for transmission of compressed/encoded digital data of pen pressure are not only limited to 3 as mentioned in the embodiment herein. There may be different numbers of light sources adopted for different applications and resolution needs.

The stylus 130 is basically a pen (inked pen) having an ink cartridge 152, which can write on real paper, or a plastic stylus not having an ink cartridge 152, which cannot write on real paper to leave ink traces. The light source 181 is preferably positioned beside the tip 150 of the stylus. The light point presented by light source 181 is provided as a reference for the handwriting input module to extract desired real-time effective strokes from images captured by digital camera 110. The light source 181 is not limited to be mounted in the vicinity of the tip 150, when implementing the present invention. In addition, a plastic stylus, which cannot write on real paper to leave ink traces, may directly provide the light source 181 (e.g. LED light) positioned at the tip 150.

FIG. 5 depicts the flowchart of a handwriting input process embodiment which may be a program that is embodied in software or firmware and that is executed by PDA 100 or computer system 200 according to the present invention. A-A' portion shown in the FIG. 5 is the strokes/pen pressure retrieving module according to the present invention. At first, at step 410, a user performs a step of defining a target area prior to handwriting input to define a target area on a writing surface (140) for the user's handwriting input. The target area is the effective area for digital camera (110) capturing images. As shown in FIG. 6, the user can interact with a computer system via screen (220) to define the target area on the writing surface. Moreover, the image of a rectangle on the writing surface taken by the digital camera will become a trapezoid. Accordingly, after defining the target area on the writing surface, a simple mathematical transformation can be performed to transform the trapezoid back into a rectangle (190) shown on the screen (220). The mathematical transformation is easily accomplished by those persons skilled in the art. As such, after obtaining the images of strokes, a mathematical transformation for the images of strokes is required as depicted in the subsequent step 433. Actually, it should be noted that as the transformation can be performed in the subsequent handwriting recognition process, the mathematical transformation is not required during the handwriting input process.

Then, an initializing step 420 is performed. The user firstly turns ON the light source 181 representing x, y coordinates and the other light sources 182, 183, 184 located at different locations for representing digital data of pen pressure. The strokes/pen pressure retrieving module then finds all of the relative positions among all light points of light sources.

When the user contacts the target area of the writing surface with the stylus 130 having a light source 181, the light source 181 is turned ON to generate a light point. Through the light point, the images captured by the digital camera 110 will be processed according to the present invention to produce video data corresponding to the images of effective strokes and the digital data of pen pressure (step 430).

The step 430 of obtaining the images of effective strokes and digital data of pen pressure is divided into 3 sub-steps, which are depicted as follows:

At step 431, a step of capturing and time-stamping images is performed. The digital camera takes images generally at the rate of 30 frames per second. In addition to a sequence of images within the target area of the writing surface captured by the digital camera, the images are time-stamped. Next, at step 432, a step of extracting images of effective strokes and digital data representing pen pressure from the captured images is performed to filter out all irrelevant images, all not related to the strokes (e.g. images of hand and stylus), and leave only the locus of the light point of the light source 181 on the stylus, i.e. "effective strokes" and the digital data representing pen pressure by comparing the captured images of frames with the light point of the light source 181 on the stylus. For example, the "intensity" of the light point of the stylus 130 can be set as a "threshold" value to filter out those captured images of which the intensity is below the threshold, and to leave only the locus of the light point on the stylus, i.e. "effective strokes" and the digital data representing pen pressure. Moreover, if the light source is an infrared light source, similarly the "intensity" of the infrared can be set as a "threshold" value to filter out those captured images of which the intensity is below the threshold, and to leave only the locus of the light point on the stylus, i.e. "effective strokes" and the digital data representing pen pressure.

As the relative positions among light sources 181-184 have been found during initializing, the sequence of light sources 182-184 from most significant bit (MSB) to least significant bit (LSB) can be determined to obtain digital data. For example, if the outputs of light sources 182-184 for representing digital data of pen pressure are (ON, OFF, ON) in sequence, it will be recognized as (1, 0, 1).

At step 433, a mathematical transformation and normalization step of the images of effective strokes is performed, similar to the descriptions related to FIG. 6 mentioned above, to transform and normalize the time-stamped images of effective strokes in order to correct skew of the images of effective strokes when the digital camera takes images. Similarly, as the transformation can be performed in the subsequent handwriting recognition process, step 433 is not required during the handwriting input process. Additionally, if step 405 of compressing and encoding the digital data of pen pressure has been performed within stylus 130, the corresponding step of decompressing and decoding the compressed/encoded digital data of pen pressure will be also performed at the step 433.

FIG. 7 depicts a sequence of image frames taken by the digital camera. As the digital camera takes images at the rate of 30 frames per second, only parts of frames are shown in FIG. 7. The digital camera captures all images shown in the view field within the target area. Accordingly, if the user writes on a writing surface, e.g. a paper, with an inked pen/stylus having a light source, which can write on real paper, there should be images of ink traces, the stylus, the light point on the stylus, and the user's hand actually shown in each frame.

For convenience in understanding, the traces of the movement of the light point in each frame of FIG. 7 are depicted as an "accumulated locus". The strokes shown in FIG. 7 include solid lines and broken lines, in which the ink traces of the pen represented by the solid lines overlap or parallel the accumulated locus of the light point on the stylus, and the broken lines represent the accumulated locus of the tip 150 on the stylus when the pen is lifted from the writing surface (that is, the light source 181 is turned OFF, and then the light point disappears). Accordingly, each frame of FIG. 7 will include the images of ink traces, the stylus, the "accumulated locus" of the light point on the stylus, and the user's hand, in which the "accumulated locus" of the light point on the stylus constitutes the desired "effective strokes".

The images of each frame will actually not include the images of the broken lines in FIG. 7, and the image of the broken lines in each frame will only include the extinguished (OFF) light source 181 beside the tip 150 of the stylus or pen 130, located at a certain position of the broken lines of each frame (not light point, as the pen is lifted from the writing surface, the light source 181 is turned OFF, and then the light point disappears). By utilizing the light point on the stylus, the present invention can be performed to easily filter out the images of ink traces, the stylus other than the light point, and the user's hand, and only leave the video data of the accumulated focus of the light point into storage. After performing step 432, the video data stored in storage corresponds to the "effective strokes", which are constituted by the accumulated focus of the light point on the stylus, i.e. the solid lines in the frame 9 of FIG. 7. The ink traces on the paper correspond to the effective strokes described herein.

If the user writes on a non-paper writing surface with a stylus/pen having the light source 181, there are no ink traces of strokes. Accordingly, frames taken by the digital camera will only include the stylus, the light point, and the image of the user's hand, without ink traces as shown in FIG. 7. The accumulated locus of the light point on the stylus constitutes the desired effective strokes.

FIG. 8 further depicts an example of performing step 430 in which there are no results of light sources 182-184 representing digital data of pen pressure shown. When writing "I" on a writing surface, the images of effective strokes 700 captured by digital camera 110 include solid lines ("I") shown in FIG. 8, i.e. segments 1, 3, and 5 after completing step 430. In fact, the solid lines ("I") and the broken lines are the accumulated locus of the light source 181 beside the tip 150 of the stylus respectively when the stylus is brought into contact with the writing surface and when the stylus is lifted off the writing surface. The periods 2 and 4 indicate the periods when the light point is OFF or extinguished when the stylus is lifted off of the writing surface, and correspond to the segments 2 and 4 of the broken lines of the images of strokes. Accordingly, the "intensity" of the light point of the stylus 130 is set as a "threshold" value to filter out those captured strokes images of which the intensity is below the threshold (e.g. the images of the user's hand and the stylus, and segments 2 and 4 of the broken lines), and leave only the locus of the light point on the stylus, i.e.

"effective strokes" as the solid lines "I" shown in FIG. 8. Similarly, the effective strokes shown in FIG. 7 are processed after step 430, the result of which will appear as shown in FIG. 9 in which there are only the solid lines from FIG. 7 stored in storage.

The effective strokes and the digital data of pen pressure obtained after performing step 430 will be fed to a handwriting recognition engine for recognition (Step 460). The object of the present invention is to provide effective strokes of handwriting input and the digital data of pen pressure for recognition, but not the recognition engine itself. Therefore, the handwriting recognition engine can be any suitable handwriting recognition system.

The present invention is to retrieve the accumulated locus (e.g. effective strokes) of a light point on a stylus, other than the ink locus. Therefore, the method of handwriting input according to the present invention can be used for a real paper environment or for a non-paper environment on which there are no ink traces of strokes.

Although the above illustrates the preferred embodiment of the present invention, it is realized that the present invention can be implemented in hardware, software or any combination thereof. Therefore, there exist other changes in form and details. For example, as an alternative, the mentioned light sources 182-184 on the stylus representing digital data of pen pressure can be arranged to have colors different from that of the light source 181 indicating x-y coordinates of strokes (e.g. as the preferred alternative embodiment of the present invention, the light sources 182-184 are respectively Red, Green and Blue LEDs, while the light source 181 is a White LED). As such, the effective strokes can be directly filtered out via the white light, while the desired digital data of pen pressure can further be filtered out respectively via red, green and blue lights. Accordingly, the initializing step 420 shown in FIG. 5 mentioned above can be omitted.

It is important to note that those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

BRIEF DESCRIPTION OF THE DRAWINGS

In order to further understand the invention and advantages thereof, the following detailed description of the disclosed embodiment will be considered in conjunction with the accompanying drawings, in which.

Figure 1:
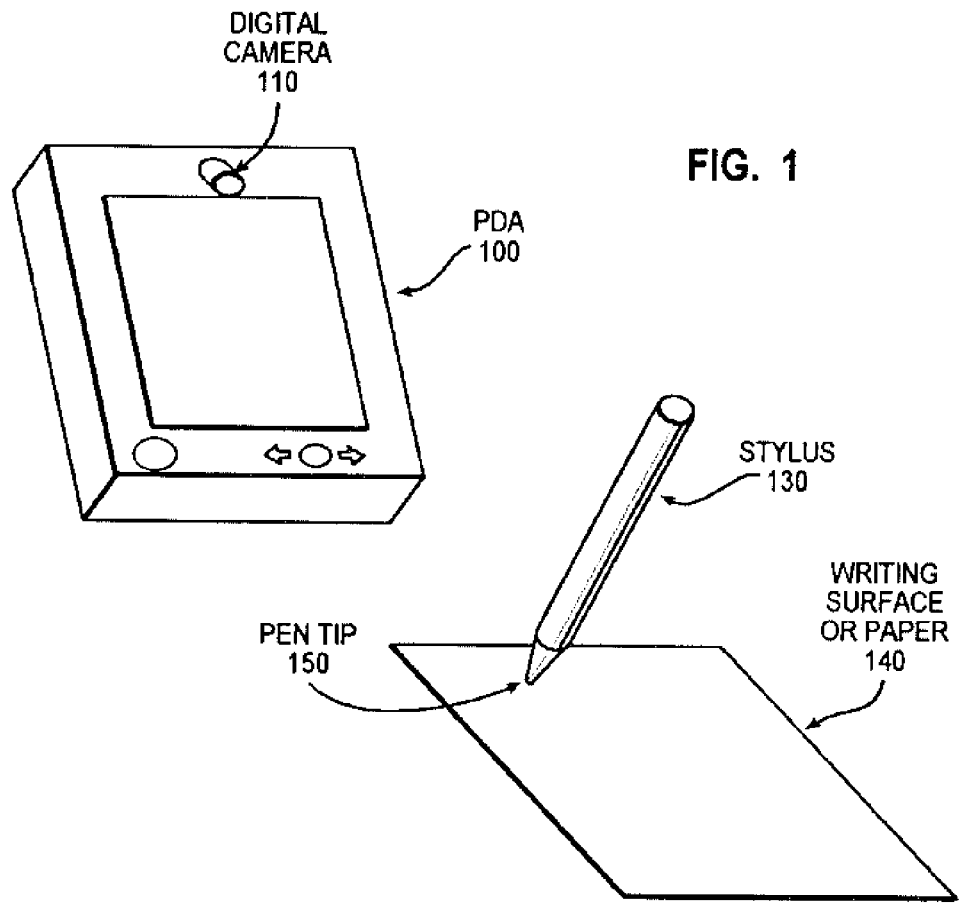
FIG. 1 & FIG. 2 respectively illustrate different information processing systems implementing the present invention.
Figure 8:
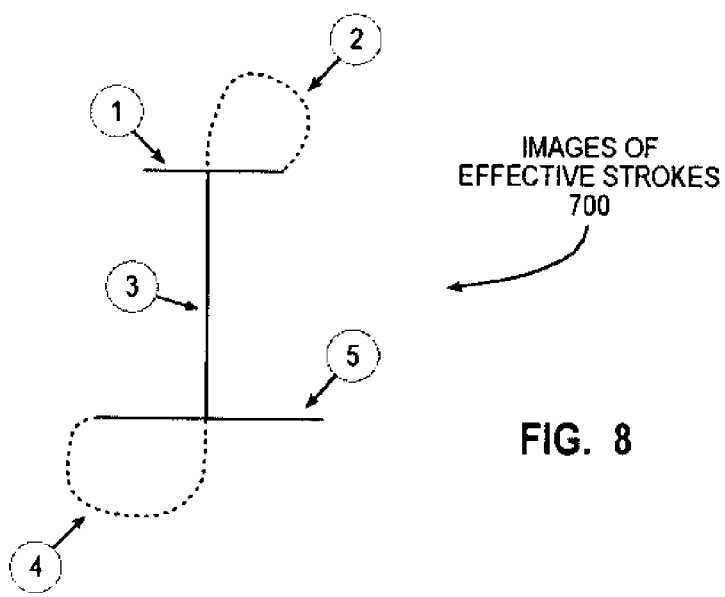
FIG. 8 depicts an example of performing step 430.
Figure 2:
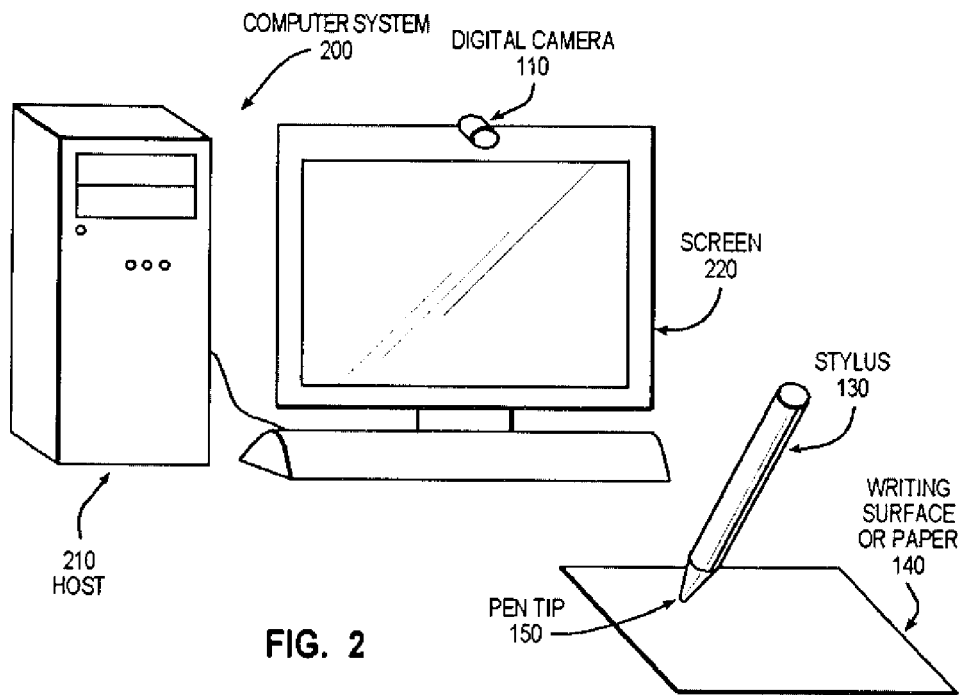
Figure 6:
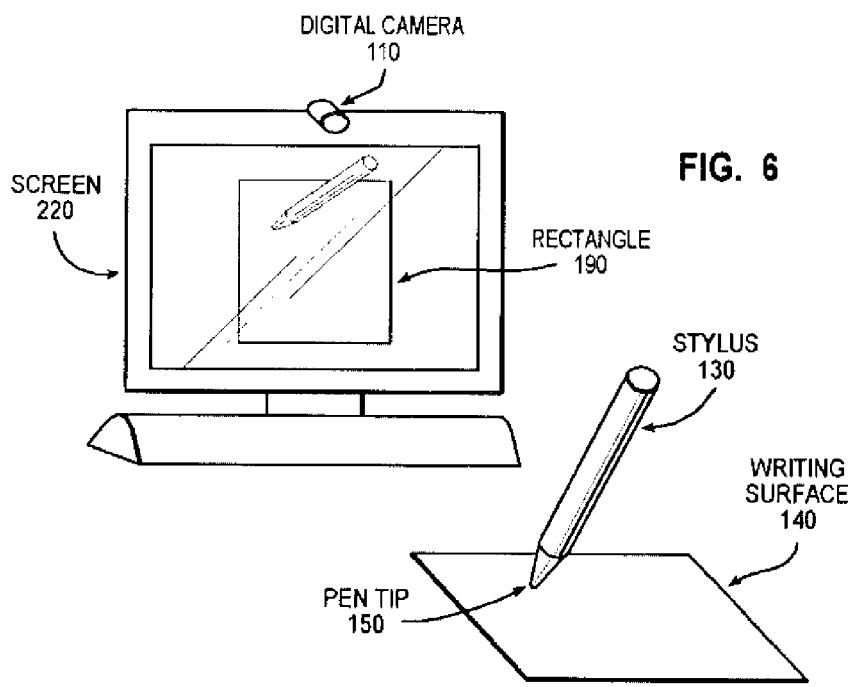
FIG. 6 depicts that the user can interact with a computer system via screen 220 to define the target area on the writing surface.
Figure 3:
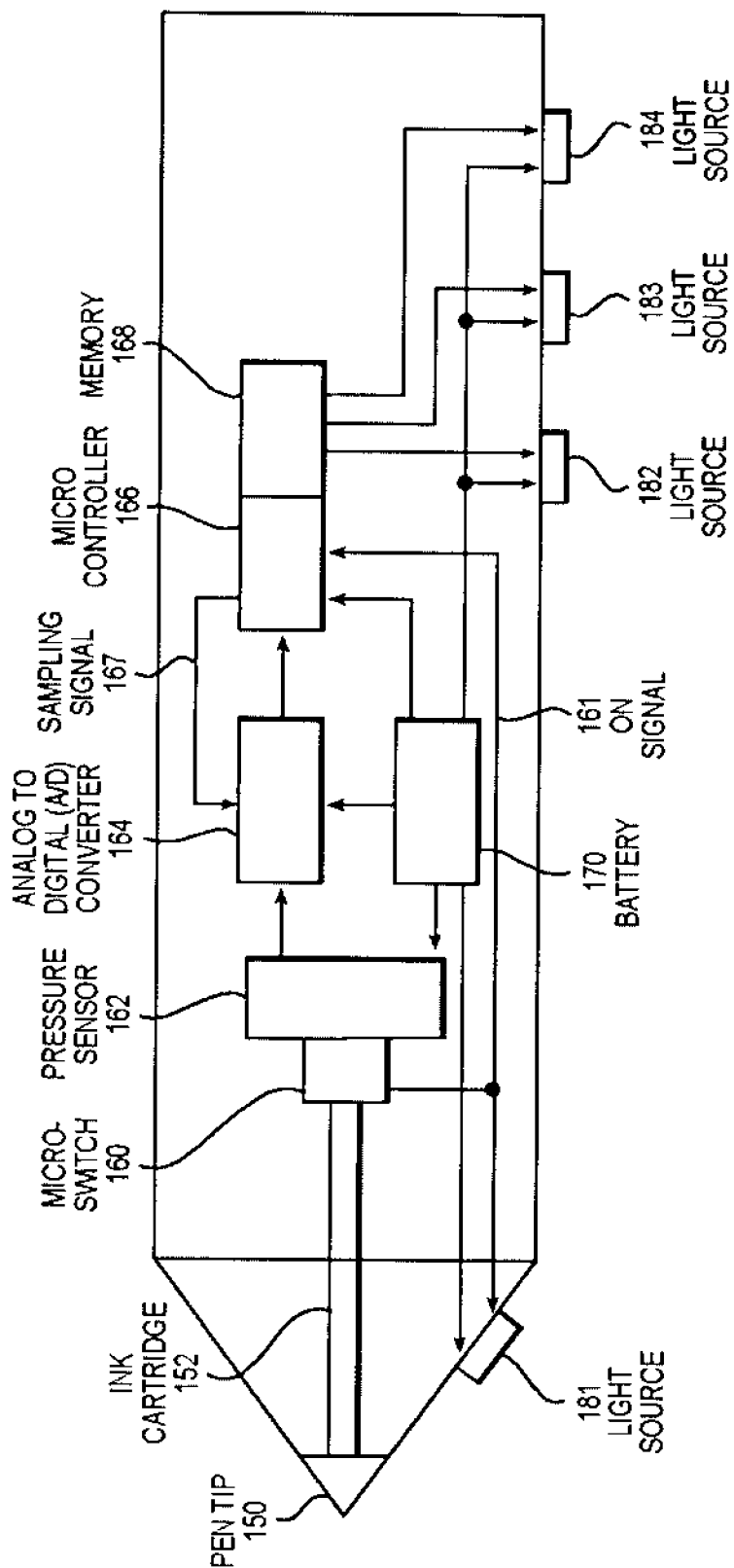
FIG. 3 shows a stylus 130 used for the present invention.
Figure 4:
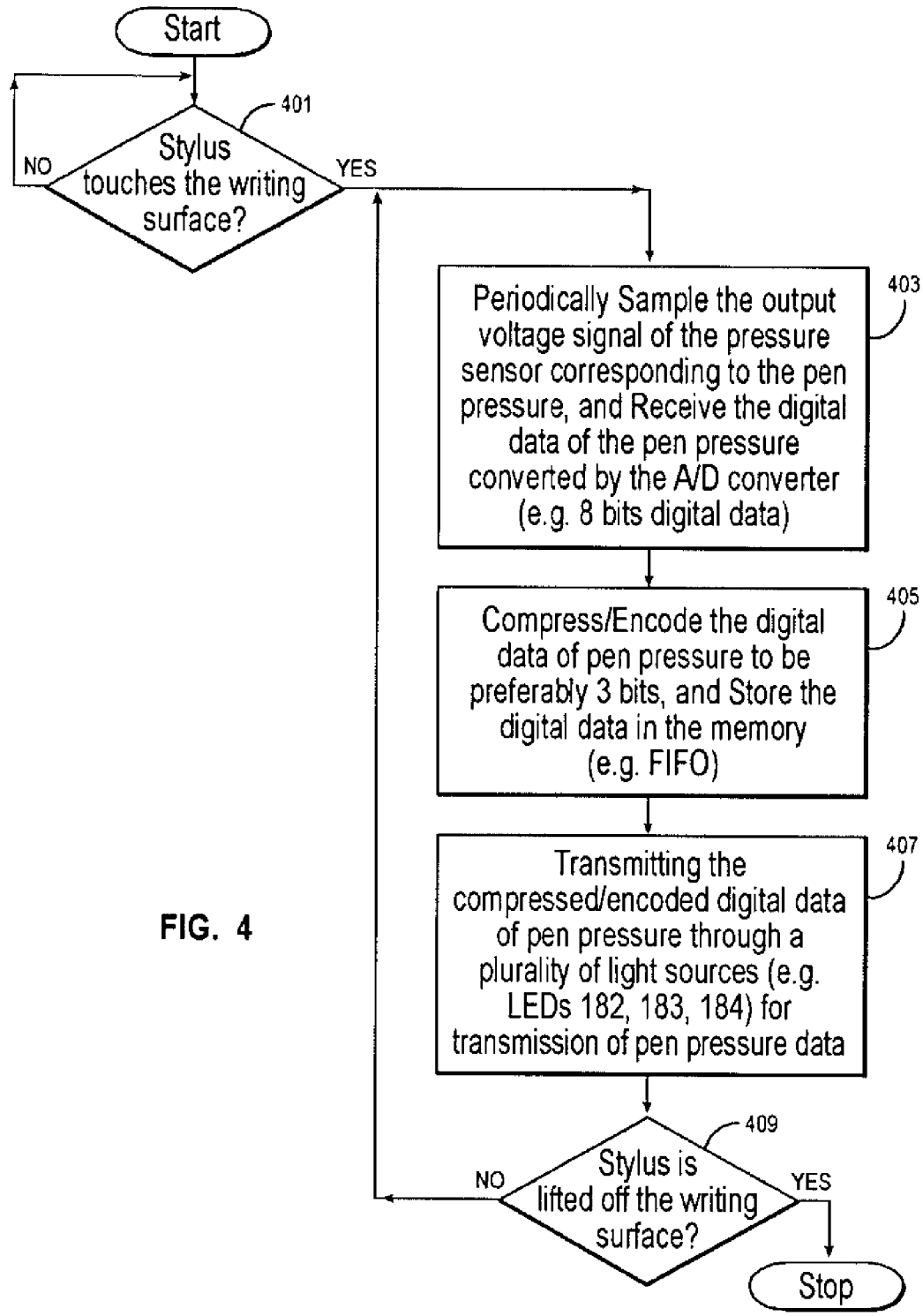
FIG. 4 depicts the flowchart of a monitor module in a micro-controller 166 embedded in the stylus 130 according to the present invention.
Figure 5:
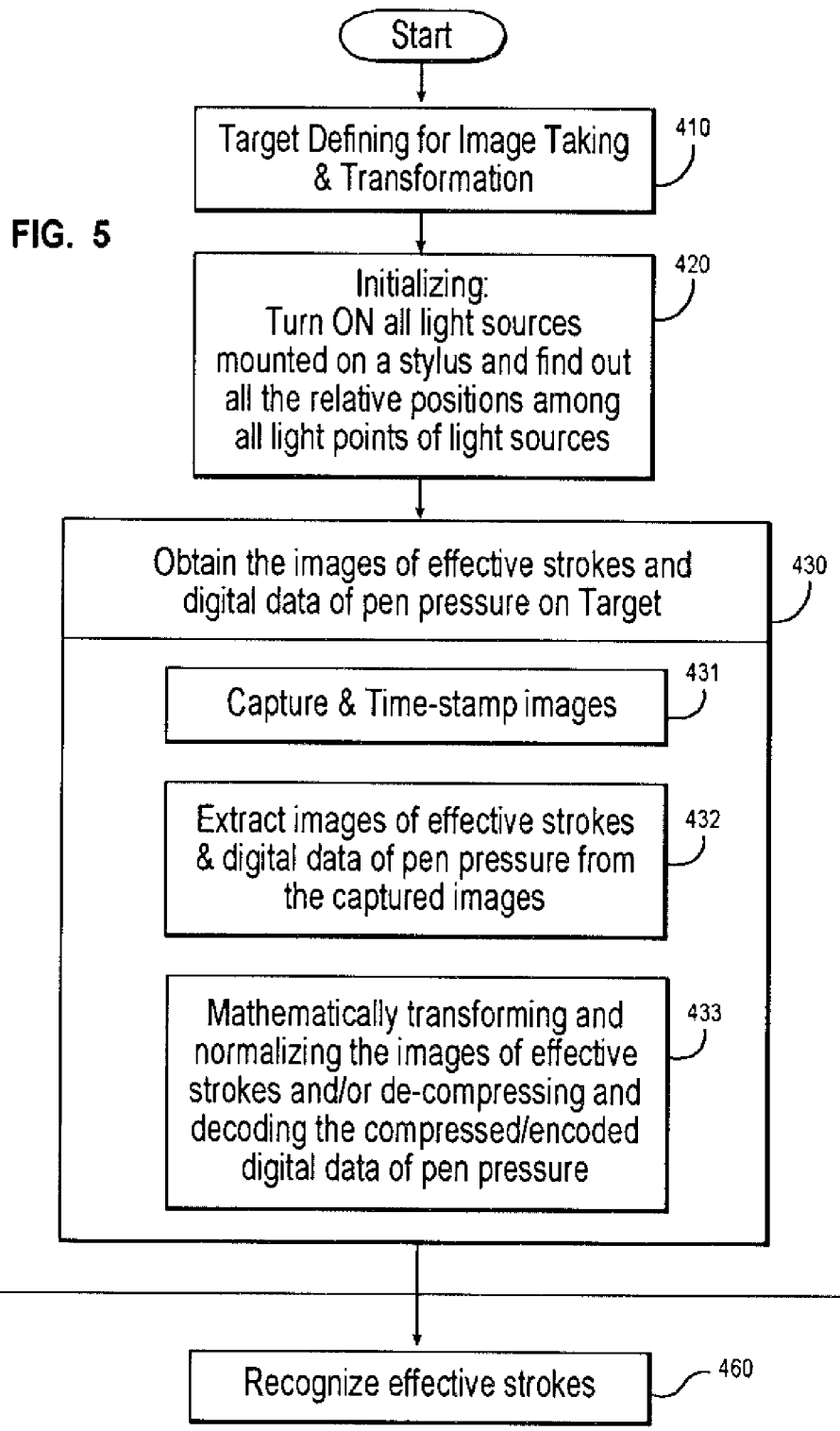
FIG. 5 depicts the flowchart of a handwriting input process embodiment according to the present invention.
Figure 7:
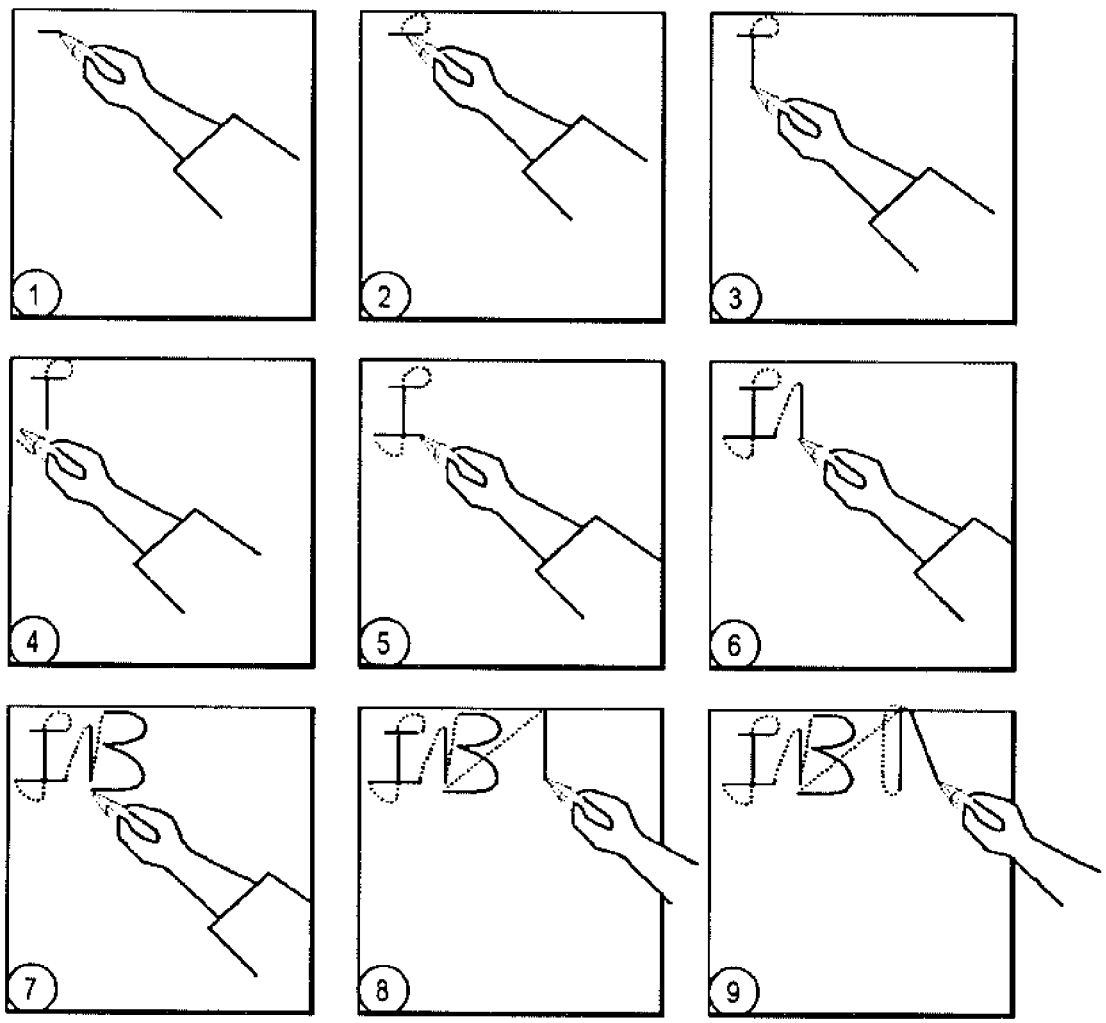
FIG. 7 depicts a sequence of image frames taken by a digital camera.
Figure 9:
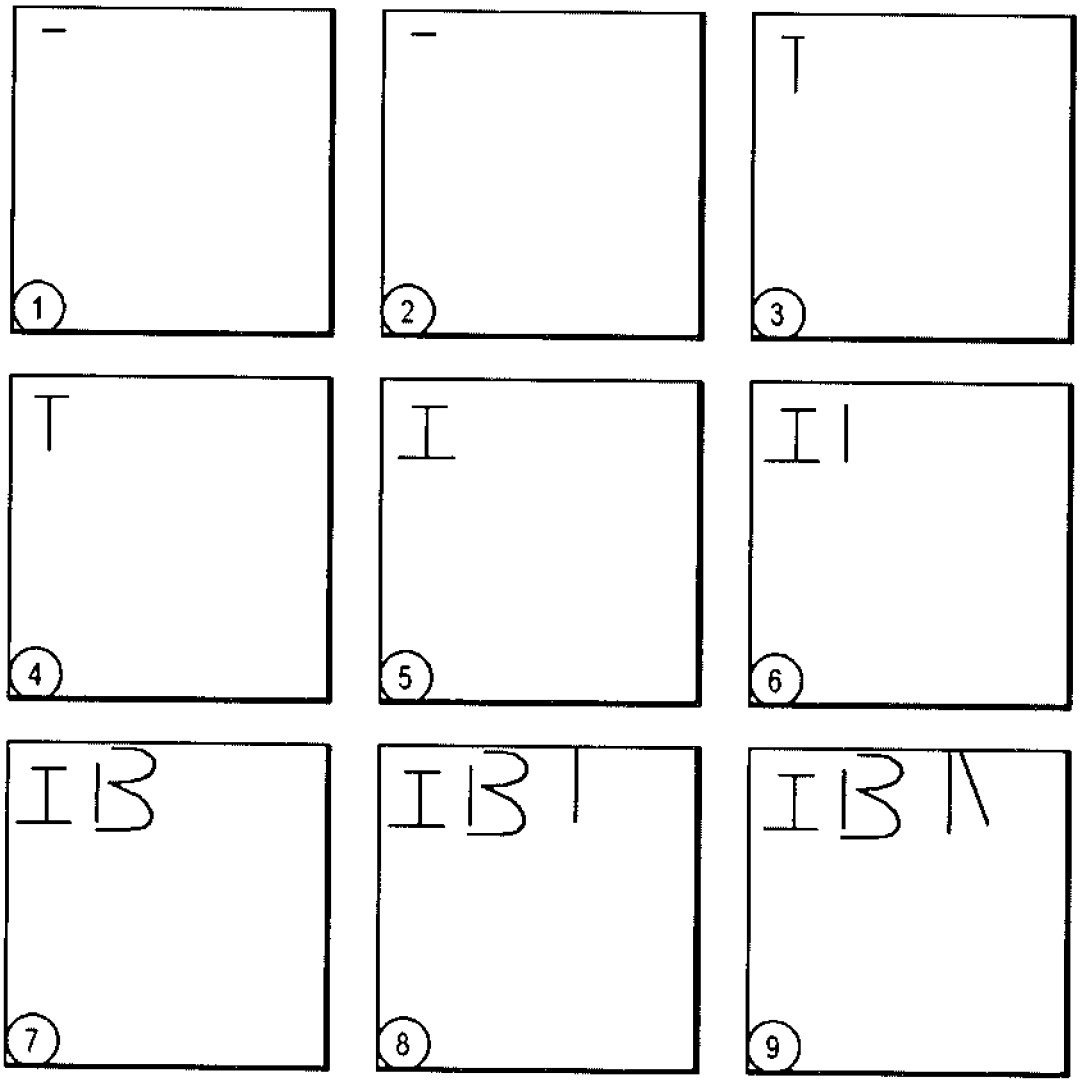
FIG. 9 depicts the results of processing the effective strokes shown in FIG. 7 via step 430, in which there are only the solid lines in FIG. 7 stored in storage.

What is claimed is:

1. A method of video-based handwriting input, comprising:
capturing an image including effective strokes and digital data of pen pressure, when a user writes on a writing surface with a stylus having a plurality of light sources each with a different color, said image is time-stamped; wherein said plurality of light sources each with a different color includes a light source indicating x-y coordinates of strokes of the stylus and a plurality of other light sources for transmission of digital data of pen pressure on the stylus; wherein the stylus comprises a micro-switch, when the stylus touches the writing surface, the micro-switch is turned on point, and wherein the stylus comprises a micro-controller that compresses and encodes the digital data of pen pressure outputted from an A/D converter from a first number of bits of digital data to a second number of bits of compressed and encoded digital data that is less than the first number of bits and transmits the compressed and encoded digital data of pen pressure as light signals using the plurality of other light sources on the stylus, each of the second number of bits of compressed and encoded digital data corresponding to a different one of the plurality of other light sources on the stylus each with the different color;
extracting effective stroke images and the digital data of pen pressure to let the light source indicating x-y coordinates of strokes turn ON and generate a light
without performing an initializing step by comparing captured images with a color of the light point of the light source indicating x-y coordinates of strokes of the stylus and each different color of said plurality of other light sources in a transmission of the compressed and encoded digital data of pen pressure;
performing mathematical transformation and normalization of the extracted effective stroke images transforming and normalizing the extracted effective stroke images correcting skew of the extracted effective stroke images taken by a camera; and
decompressing and decoding the compressed and encoded digital data of pen pressure.

2. The method according to claim 1, wherein said step of capturing the image including effective strokes and digital data of pen pressure is performed by one of a digital camera, a charge coupled device (CCD) or complementary metal oxide (CMOS) camera, or an infrared camera.

3. The method according to claim 1, wherein said stylus is one of a pen having a light source, which can write on paper, or a plastic stylus having a light source, which cannot write on paper to leave ink traces.

4. The method according to claim 1, wherein the light source indicating x-y coordinates of strokes is located in proximity to a tip of the stylus.

5. The method according to claim 1, further comprising:
feeding said effective strokes and said digital data of pen pressure to a handwriting recognition engine for recognition.

6. The method according to claim 1, wherein the step of extracting effective stroke images and digital data of pen pressure is performed by setting an intensity of the light point of the light source indicating x-y coordinates of strokes as a threshold value to filter out those captured images of which the intensity is below the threshold in order to extract the effective stroke images and the digital data of pen pressure.

7. A computer readable recordable-type storage medium having instructions stored thereon that when executed by a computer cause the computer to perform a method of video-based handwriting input, comprising:
capturing an image including effective strokes and digital data of pen pressure, when a user writes on a writing surface with a stylus having a plurality of light sources each with a different color, said image is time-stamped; wherein said plurality of light sources each with a different color includes a light source indicating x-y coordinates of strokes of the stylus and a plurality of other light sources for transmission of digital data of pen pressure on the stylus; wherein the stylus comprises a micro-switch, when the stylus touches the writing surface, the micro-switch is turned on to let the light source indicating x-y coordinates of strokes turn ON and generate a light point, and wherein the stylus comprises a micro-controller that compresses and encodes the digital data of pen pressure outputted from an A/D converter from a first number of bits of digital data to a second number of bits of compressed and encoded digital data that is less than the first number of bits and transmits the compressed and encoded digital data of pen pressure as light signals using the plurality of other light sources on the stylus, each of the second number of bits of compressed and encoded digital data corresponding to a different one of the plurality of other light sources on the stylus each with the different color;

extracting effective stroke images and the digital data of pen pressure without performing an initializing step by comparing captured images with a color of the light point of the light source indicating x-y coordinates of strokes of the stylus and each different color of said plurality of other light sources in a transmission of the compressed and encoded digital data of pen pressure;

performing mathematical transformation and normalization of the extracted effective stroke images transforming and normalizing the extracted effective stroke images correcting skew of the extracted effective stroke images taken by a camera; and decompressing and decoding the compressed and encoded digital data of pen pressure.

8. A video-based handwriting input apparatus, comprising:

a stylus comprising a micro-switch and a plurality of light sources each with a different color, said plurality of light sources each with a different color including a light source indicating x-y coordinates of strokes of the stylus and a plurality of other light sources for transmission of digital data of pen pressure on the stylus, when the stylus touches a writing surface, the micro-switch is turned on to let the light source indicating x-y coordinates of strokes turn ON and generate a light point, wherein the stylus comprises a micro-controller that compresses and encodes the digital data of pen pressure outputted from an A/D converter from a first number of bits of digital data to a second number of bits of compressed and encoded digital data that is less than the first number of bits and transmits the compressed and encoded digital data of pen pressure as light signals using the plurality of other light sources on the stylus, each of the second number of bits of compressed and encoded digital data corresponding to a different one of the plurality of other light sources on the stylus each with the different color;

a digital image capturing means for capturing an image including effective strokes and the digital data of pen pressure, said image is time-stamped;

effective strokes and digital data of pen pressure extracting means for extracting effective stroke images and the digital data of pen pressure without performing an initializing step by comparing captured images with a color of the light point of the light source indicating x-y coordinates of strokes of the stylus and each different color of said plurality of other light sources in a transmission of the compressed and encoded digital data of pen pressure;

mathematical transformation and normalization performing means for performing mathematical transformation and normalization of the extracted effective stroke images transforming and normalizing the extracted effective stroke images correcting skew of the extracted effective stroke images taken by the digital image capturing means; and decompressing and decoding means for decompressing and decoding the compressed and encoded digital data of pen pressure.

9. The computer readable recordable-type storage medium according to claim 7, wherein said step of capturing the image including effective strokes and digital data of pen pressure is performed by one of a digital camera, a charge coupled device (CCD) or complementary metal oxide (CMOS) camera, or an infrared camera.

10. The computer readable recordable-type storage medium according to claim 7, wherein said stylus is one of a pen having a light source, which can write on paper, or a plastic stylus having a light source, which cannot write on paper to leave ink traces.

11. The computer readable recordable-type storage medium according to claim 7, wherein the light source indicating x-y coordinates of strokes is located in proximity to a tip of the stylus.

12. The computer readable recordable-type storage medium according to claim 7, the method further comprising:

feeding said effective strokes and said digital data of pen pressure to a handwriting recognition engine for recognition.

13. The computer readable recordable-type storage medium according to claim 7, wherein the step of extracting effective stroke images and digital data of pen pressure is performed by setting an intensity of the light point of the light source indicating x-y coordinates of strokes as a threshold value to filter out those captured images of which the intensity is below the threshold in order to extract the effective stroke images and the digital data of pen pressure.

14. The video-based handwriting input apparatus according to claim 8, wherein the digital image capturing means is one of a digital camera, a charge coupled device (CCD) or complementary metal oxide (CMOS) camera, or an infrared camera.

15. The video-based handwriting input apparatus according to claim 8, wherein said stylus is one of a pen having a light source, which can write on paper, or a plastic stylus having a light source, which cannot write on paper to leave ink traces.

16. The video-based handwriting input apparatus according to claim 8, wherein the light source indicating x-y coordinates of strokes is located in proximity to a tip of the stylus.

17. The video-based handwriting input apparatus according to claim 8, further comprising:

feeding means for feeding said effective strokes and said digital data of pen pressure to a handwriting recognition engine for recognition.

18. The video-based handwriting input apparatus according to claim 8, wherein extracting effective stroke images and digital data of pen pressure is performed by setting an intensity of the light point of the light source indicating x-y coordinates of strokes as a threshold value to filter out those captured images of which the intensity is below the threshold in order to extract the effective stroke images and the digital data of pen pressure.

* * * * *